(12) United States Patent
Henzinger

(10) Patent No.: US 7,631,310 B1
(45) Date of Patent: Dec. 8, 2009

(54) LOADBALANCING MULTIPLE FILES ACROSS COMPUTING DEVICES

(75) Inventor: Monika H. Henzinger, Lausanne (CH)

(73) Assignee: Google Inc., Mountain View, CA (US)

( * ) Notice: Subject to any disclaimer, the term of this patent is extended or adjusted under 35 U.S.C. 154(b) by 936 days.

(21) Appl. No.: 10/930,848

(22) Filed: Sep. 1, 2004

Related U.S. Application Data

(60) Provisional application No. 60/519,631, filed on Nov. 14, 2003.

(51) Int. Cl.
- *G06F 9/455* (2006.01)
- *G06F 9/46* (2006.01)
- *G06F 15/173* (2006.01)
- *G06F 7/00* (2006.01)

(52) U.S. Cl. .......................... 718/105; 718/1; 718/100; 718/104; 709/226; 707/7

(58) Field of Classification Search ................ 718/102, 718/104, 105, 1, 100; 707/7, 101, 205; 709/226
See application file for complete search history.

(56) References Cited

U.S. PATENT DOCUMENTS

| | | | | |
|---|---|---|---|---|
| 5,202,982 A * | 4/1993 | Gramlich et al. ............... 707/2 |
| 5,727,197 A * | 3/1998 | Burgess et al. ................. 707/2 |
| 5,864,863 A * | 1/1999 | Burrows .................. 707/103 R |
| 5,963,944 A * | 10/1999 | Adams ........................ 707/10 |
| 6,230,164 B1 * | 5/2001 | Rekieta et al. .............. 707/201 |
| 6,857,012 B2 * | 2/2005 | Sim et al. .................... 709/222 |
| 7,054,927 B2 * | 5/2006 | Ulrich et al. ................. 709/223 |
| 2002/0078184 A1 * | 6/2002 | Ujyo et al. ................... 709/220 |
| 2002/0099844 A1 * | 7/2002 | Baumann et al. ............ 709/232 |
| 2002/0194526 A1 * | 12/2002 | Ulrich et al. ................... 714/6 |
| 2003/0145093 A1 * | 7/2003 | Oren et al. ................... 709/229 |
| 2004/0019655 A1 * | 1/2004 | Uemura et al. .............. 709/217 |
| 2004/0073639 A1 * | 4/2004 | Basoglu et al. ............. 709/223 |
| 2004/0236798 A1 * | 11/2004 | Srinivasan et al. .......... 707/200 |

OTHER PUBLICATIONS

Azar et al.,"Ancient and new algorithms for load balancing in the Lp Norm", 2001, Springer-Verlag New York Inc., pp. 422-441.*
Zomaya et al., "Observation on using Genetic algorithms for dynamic load-balancing", 2001, IEEE, pp. 899-911.*
Moura et al., "Efficient distributed algorithms to build inverted files", 1999, ACM, pp. 105-112.*
Badue et al., "distributed processing using partitioned inverted files", 2001, IEEE, pp. 1-12.*
Chen et al., "approximation algorithms for data distribution with load balancing of web servers", 2001, IEEE, pp. 1-8.*

* cited by examiner

*Primary Examiner*—Meng-Ai An
*Assistant Examiner*—Caroline Arcos
(74) *Attorney, Agent, or Firm*—Harrity & Harrity, LLP

(57) ABSTRACT

A load balancer evenly distributes processing loads to multiple computing devices. A data structure may be divided into multiple files, each of which corresponds to an estimated load value. The files are assigned to the computing devices in such a way that the processing load at each of the computing devices and the number of files assigned to each of the computing devices is generally balanced.

27 Claims, 11 Drawing Sheets

LOADBALANCING MULTIPLE FILES ACROSS COMPUTING DEVICES

RELATED APPLICATION

This application claims priority under 35 U.S.C. § 119(e) based on U.S. Provisional Application Ser. No. 60/519,631, filed Nov. 14, 2003, and titled "Layouts for Greedy Restricted Loadbalancing," the disclosure of which is incorporated herein by reference.

BACKGROUND OF THE INVENTION

A. Field of the Invention

The present invention relates generally to computing devices, and more particularly, to loadbalancing of computing devices.

B. Description of the Related Art

The World Wide Web ("web") contains a vast amount of information. Search engines assist users in locating desired portions of this information by cataloging web pages. Typically, in response to a user's request, the search engine returns references to documents relevant to the request.

Search engines may base their determination of the user's interest on search terms (called a search query) entered by the user. The goal of the search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

The corpus of pre-stored web documents may be stored by the search engine as an index of terms found in the web pages. The index may be formed as an inverted index data structure that stores, for each term, a list of all documents that contain the term. In the context of the web, such an index can be very large, such as one covering three billion or more documents. Such a large data structure will generally not fit on one device, but instead may be partitioned over multiple devices ("back end devices"). Given a user search query to a "front end" device, the search request is then sent to the back end devices. Each back end device may perform a search over its portion of the data structure and return its results to the front end device.

Different search requests may take varying amounts of time on different parts of the index. It is possible that the search request over one portion of the index can be completed very quickly for most of the searches while taking a longer time on different portions of the index. In this situation, the device servicing the "slow" portion of the index can become a bottleneck that may tend to slow down the other devices.

SUMMARY OF THE INVENTION

According to one aspect, a method includes dividing a data structure into files and determining loads for the files. The method further includes assigning the loads to computing devices such that each of the computing devices is assigned a predetermined number of files, plus or minus one file, and such that a maximum total load assigned to a computing device is approximately equal to the average load assigned to the computing devices.

According to another aspect, a method of assigning files to computing devices includes sorting the files based on load values estimated for each of the files and assigning the files to the computing devices such that a maximum load value assigned to a computing device is approximately equal to the average load assigned to the computing devices.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The detailed description does not limit the invention.

Overview

As described herein, a load balancing system allocates portions of a data structure, such as portions of a large document index, over a number of devices. The portions of the data structure are allocated in such a way that the processing load across the devices is generally balanced.

Figure 1:
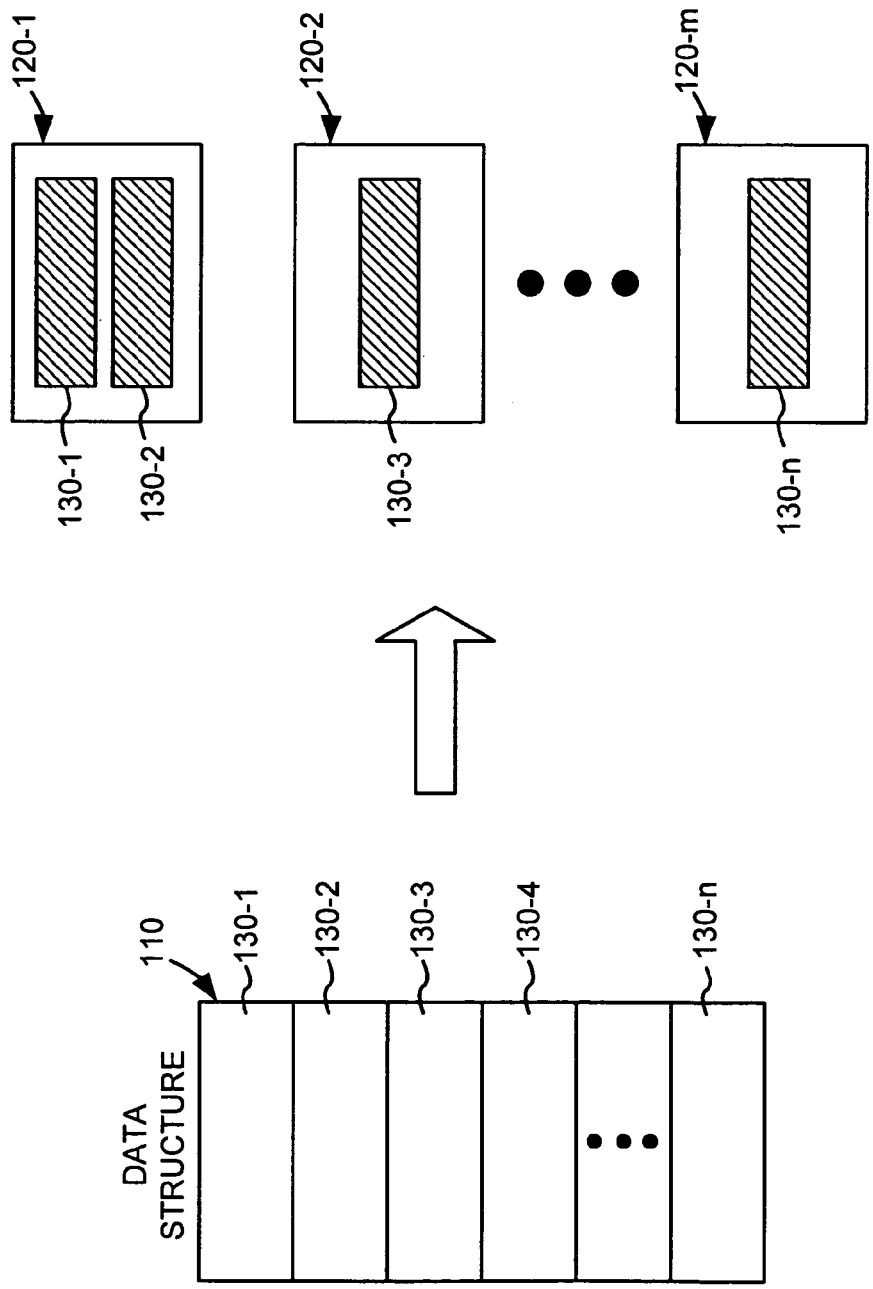
FIG. 1 is a diagram conceptually illustrating loadbalancing as performed consistent with aspects of the invention.

FIG. 1 is a diagram conceptually illustrating loadbalancing as performed consistent with aspects of the invention. Data structure 110 may be a relatively large data structure, such as one that indexes a large number of documents. Access to data structure 110 may be performed by a number of devices, labeled as machines 120-1 through 120-$m$ in FIG. 1. Machines 120 may be, for example, computing and/or storage devices. In particular, each machine 120 may be assigned a portion of data structure 110, labeled in FIG. 1 as portions 130-1 through 130-$n$. Portions 130 of data structure 110 should ideally be assigned to machines 120 in a manner that balances the computing resources (i.e., the load) used by each of machines 120 as much as possible.

System Overview

Figure 2:
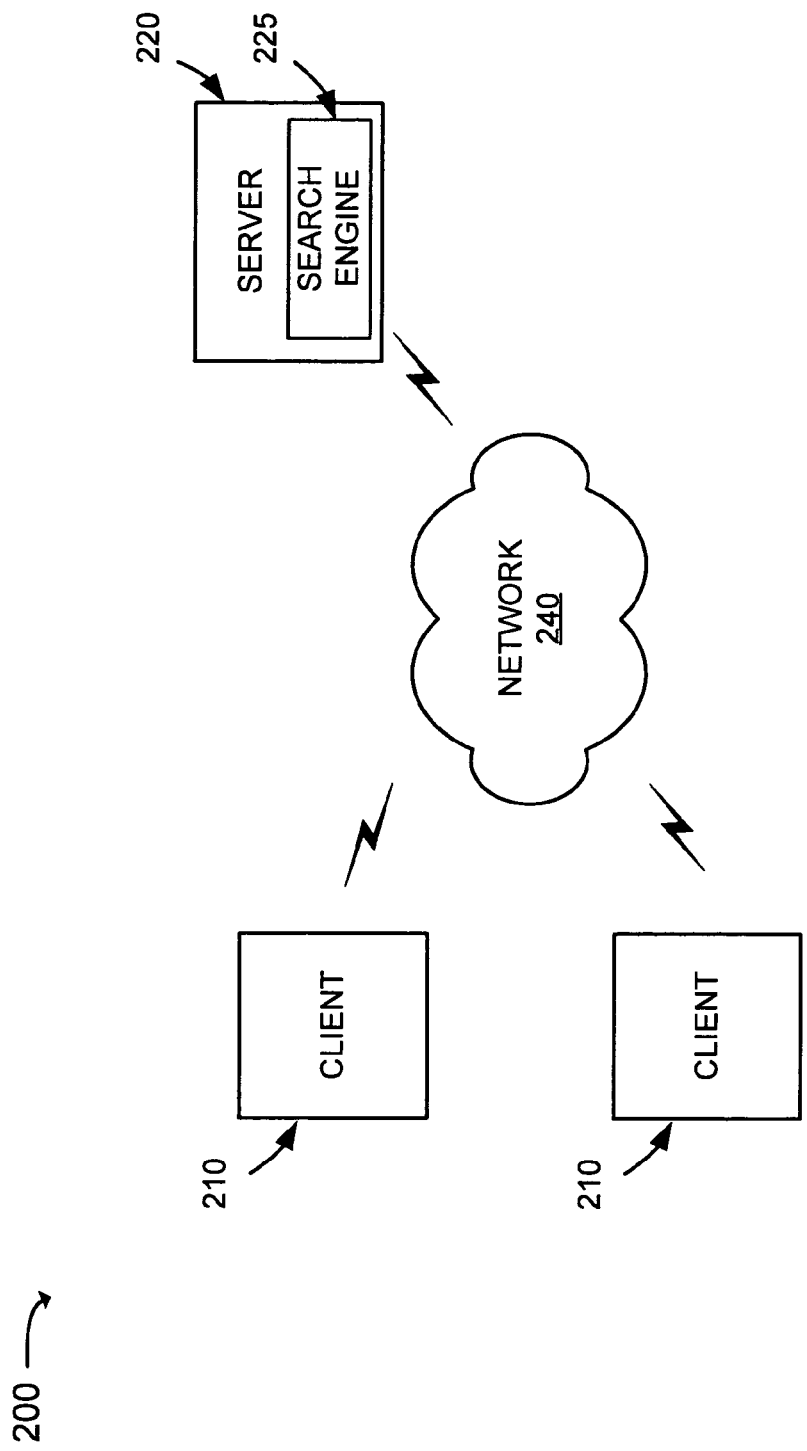
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220 via a network 240. Network 240 may include a local area network (LAN), a wide area network (WAN), a telephone network, such as the Public Switched Telephone Network (PSTN), an intranet, the Internet, or a combination of networks. Two clients 210 and a server 220 have been illustrated as connected to network 240 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Server 220 may include server entities that process, search, and/or maintain documents in a manner consistent with the principles of the invention. Clients 210 and server 220 may connect to network 240 via wired, wireless, or optical connections.

Server 220 may operate as a web server and include appropriate web server software 225. In one implementation, web server software 225 may function as a search engine, such as a query-based web page search engine. In general, in response to client requests, search engine 225 may return sets of documents to clients 210. The documents may be returned to clients 210 as a web page containing a list of links to web pages that are relevant to the search query. This list of links may be ranked and displayed in an order based on the search engine's determination of relevance to the search query. Although server 220 is illustrated as a single entity, in practice, server 220 may be implemented as a number of server devices.

Exemplary Client/Server Architecture

Figure 3:
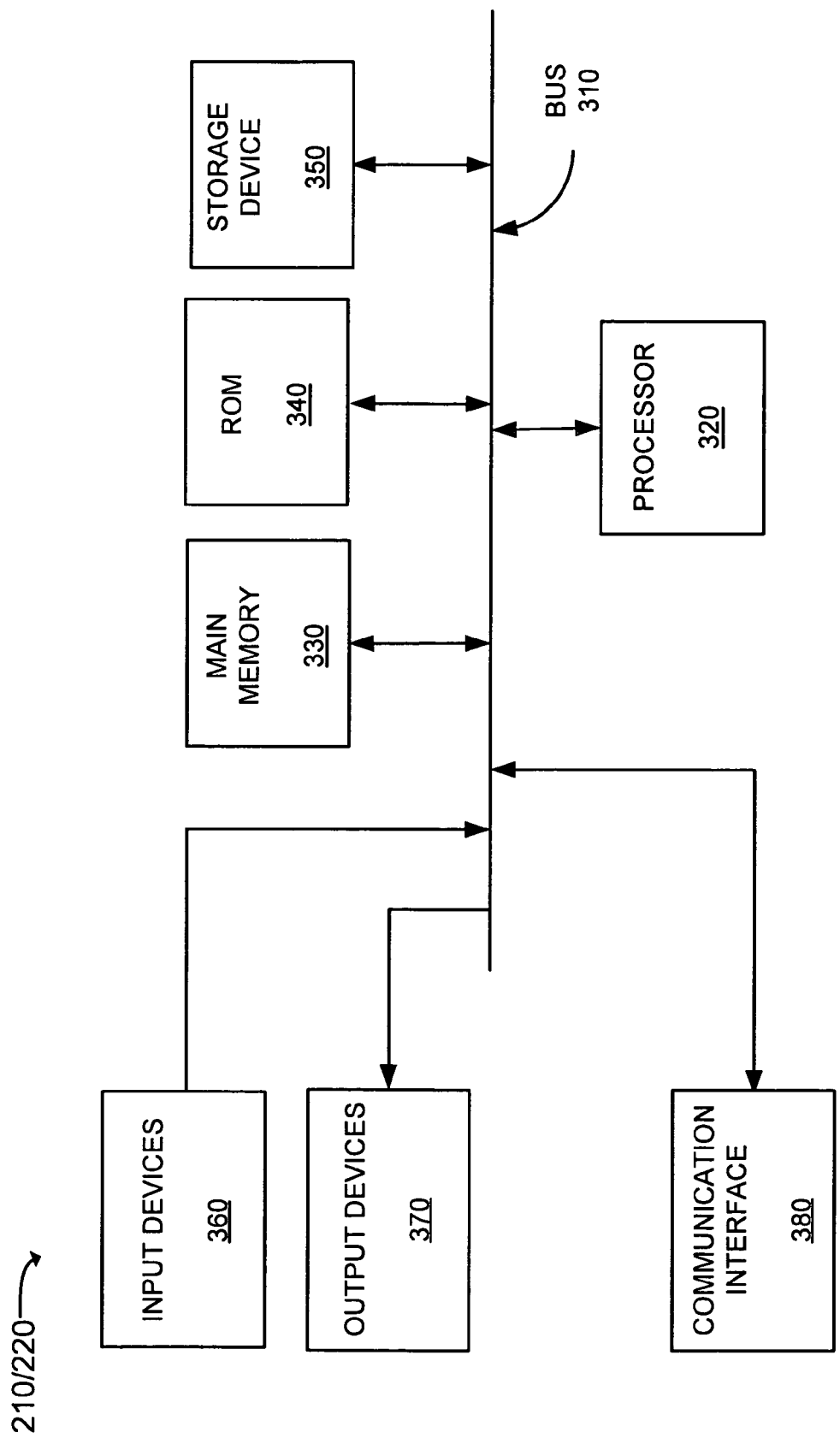
FIG. 3 is an exemplary diagram of a client or server according to an implementation consistent with the principles of the invention.

FIG. 3 is an exemplary diagram of a client 210 or server 220 according to an implementation consistent with the principles of the invention. Client/server 210/220 may include a bus 310, a processor 320, a main memory 330, a read only memory (ROM) 340, a storage device 350, one or more input devices 360, one or more output devices 370, and a communication interface 380. Bus 310 may include one or more conductors that permit communication among the components of client/server 210/220.

Processor 320 may include any type of conventional processor or microprocessor that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device(s) 360 may include one or more conventional mechanisms that permit a user to input information to client/server 210/220, such as a keyboard, a mouse, a pen, voice recognition and/or biometric mechanisms, etc. Output device(s) 370 may include one or more conventional mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

Processes consistent with principles of the invention may be implemented as software instructions which may be read into memory 330 from another computer-readable medium, such as data storage device 350, or from another device via communication interface 380. Alternatively, hardwired circuitry may be used in place of or in combination with software instructions to implement processes consistent with the present invention. Thus, implementations consistent with the principles of the invention are not limited to any specific combination of hardware circuitry and software.

Loadbalancing

Figure 4:
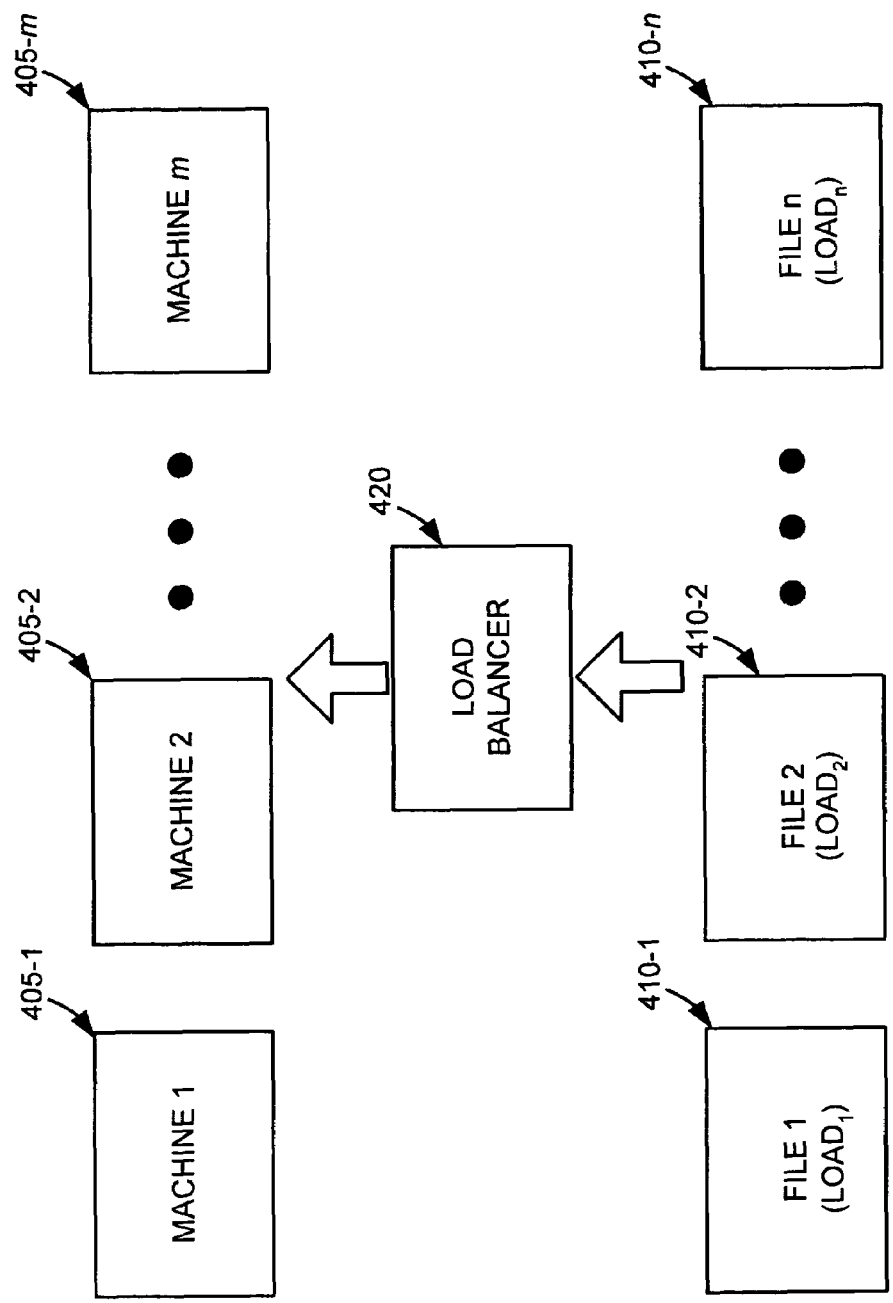
FIG. 4 is a block diagram conceptually illustrating an implementation for loadbalancing consistent with aspects of the invention.

FIG. 4 is a block diagram conceptually illustrating an implementation consistent with aspects of the invention. As shown in FIG. 4, m computing devices, labeled as machines 405-1 through 405-$m$, are to be used to store n files 410-1 through 410-$n$. Files 410 may together define a larger data structure, such as data structure 110. The term file, as used herein, is intended to broadly define a unit of information in a computer-readable format.

Each file 410 may be associated with a load that relates to the processing resources required to service the file. The loads for files 410 are indicated as loads $Load_1$ through $Load_n$, respectively, in FIG. 4. The load for a file may be estimated based on, for example, a historical analysis of the processing resources required by the file. In one implementation, machines 405 may be computing devices that can collectively be considered to be a part of search engine 225 and server 220.

Load balancer 420 may assign files 410 to machines 405. Ideally, load balancer 420 should assign the files in such a way that the average load per machine is balanced.

Before describing the operation of load balancer 420, it will be helpful to more formally describe the relationships of machines 405, files 410, and the loads associated with files 410. Given m machines $m_1, \ldots, m_m$ (i.e., machines 405) and n files $f_1, \ldots, f_n$ (i.e., files 410), assume that each machine $m_i$ can store $s_i$ many files such that $$s_i \geq \left[\frac{n}{m}\right] + 1$$

and each file $f_j$ has a load l(j) associated with it. A file 410 may be stored on multiple machines 405. In this situation, the load associated with each file can be arbitrarily divided over the multiple machines, assigning each machine $m_i$ only a partial load fl(j,i). Let $FL_i = \Sigma_j fl(j,i)$ define the sum of the (potentially partial) loads of the files assigned to machine $m_i$. For an ideally balanced system, the maximum value of $FL_i$, taken over the m machines, called $max_i FL_i$, is minimized and the number of files assigned to machine $m_i$ is at most $s_i$. That is, in the best case, the loads are perfectly balanced, i.e., $$\max_i FL_i = \frac{1}{m}\sum_j l(j).$$

This value, which represents an average file load per machine, will be referred to hereafter as the "Average" load.

Figure 5:
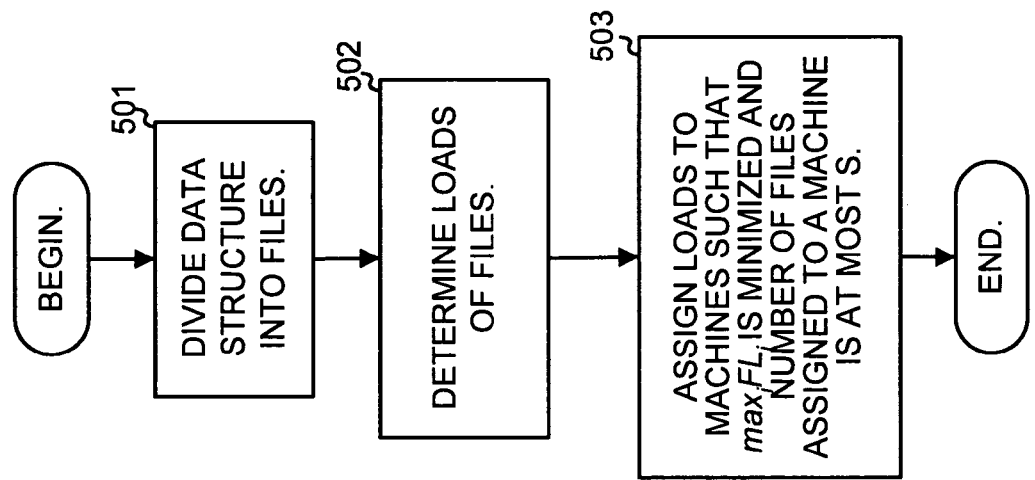
FIG. 5 is a flowchart illustrating exemplary processes for loadbalancing consistent with aspects of the invention.

FIG. 5 is a flowchart illustrating exemplary processes for assigning loads to machines 405. The processes in FIG. 5 generally operate to assign a load of approximately A to each of machines 405.

A data structure, such as data structure 110, may be divided into a number of files (act 501). For example, the data structure may be divided so that each of the files is of approximately the same size and is of a size that is conveniently processed by machines 405. The loads corresponding to each of the files may determined (act 502). As mentioned, the load of a file can be estimated based on, for example, a historical analysis of the processing resources required by the file. The loads may be quantified by assigning numerical values to the loads. For example, a load value of 20 may indicate a load that requires approximately twice the processing resources of a load value of 10. The loads may then be assigned to machines 405 such that $\max_i FL_i$ is minimized and the number of files assigned to a machine is at most $s_i$ (act 503).

Figure 6:
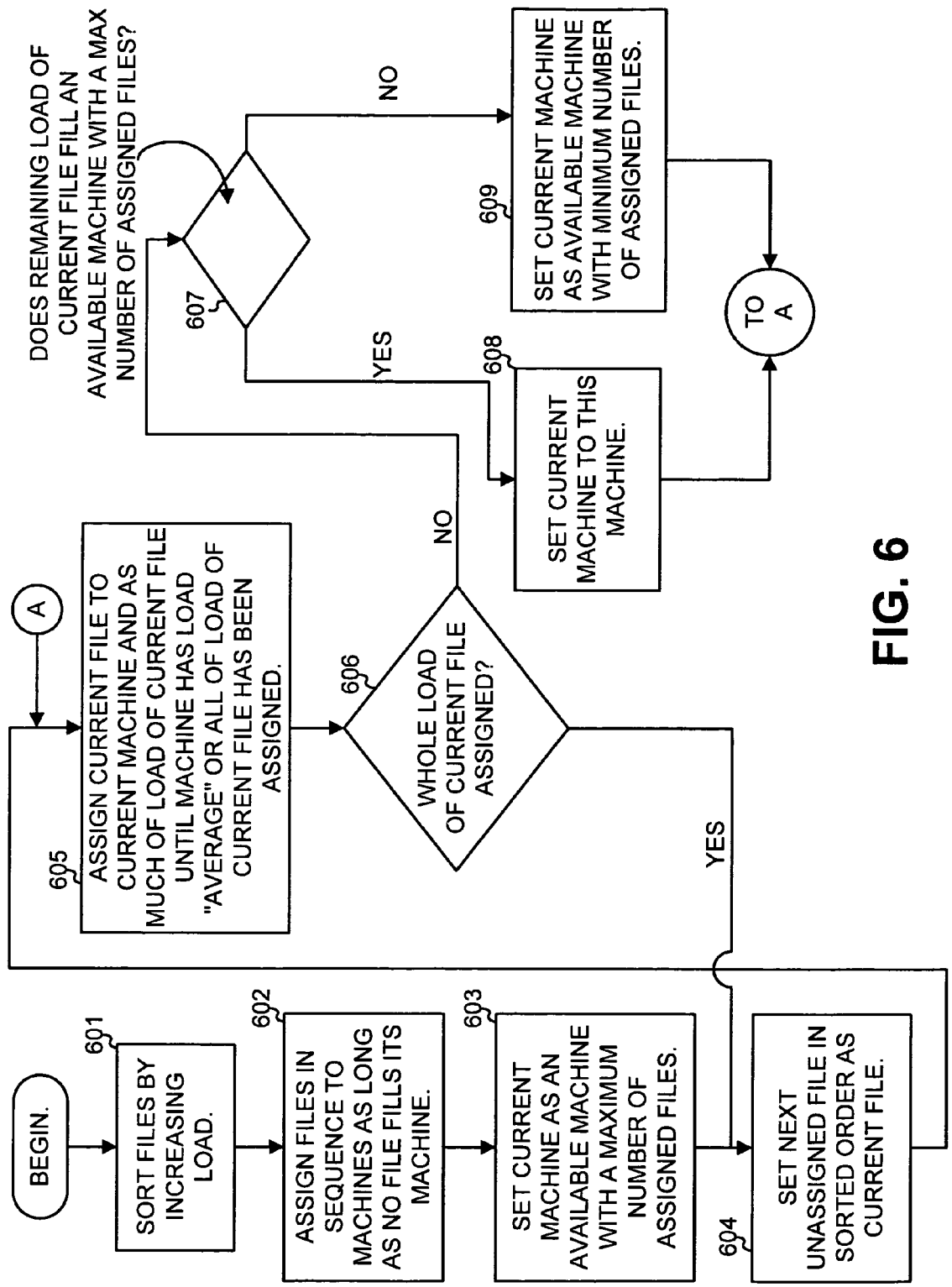
FIG. 6 is a flowchart illustrating exemplary processes for performing portions of the processes illustrated in FIG. 5.

FIG. 6 is a flowchart illustrating exemplary processes for performing act 503. FIGS. 7A-7D illustrate the processes of FIG. 6 applied to an exemplary set of files.

Figure 7A:
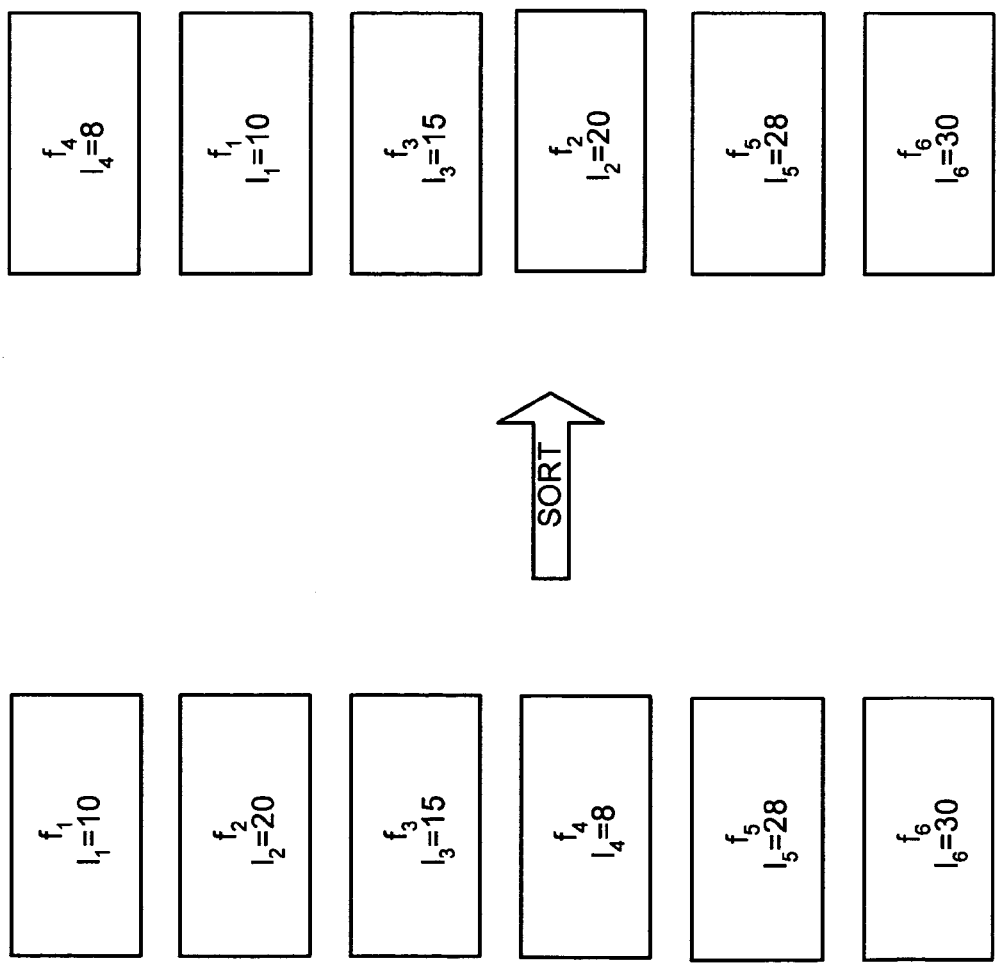
FIGS. 7A-7D illustrate the processes of FIG. 6 applied to an exemplary set of files.

Files 410 may be initially sorted according to increasing load of files 410 (act 601). FIG. 7A is a diagram illustrating six exemplary files $f_1$ to $f_6$ and corresponding exemplary load values, before and after sorting the files. As shown in FIG. 7A, the sorted files are arranged based on increasing loads.

The files may next be assigned to machines 405 in sequence as long as no file "fills" its machine (act 602). In one implementation, the files are assigned in a round-robin sequence to the machines. As used herein, a file is said to "fill" its machine when the load of the file, when assigned to the machine, increases the load of the machine to Average. Thus, a machine can be said to be "filled" or "not available" if the load assigned to the machine is equal to or greater than Average. Otherwise, the machine is available.

Figure 7B:
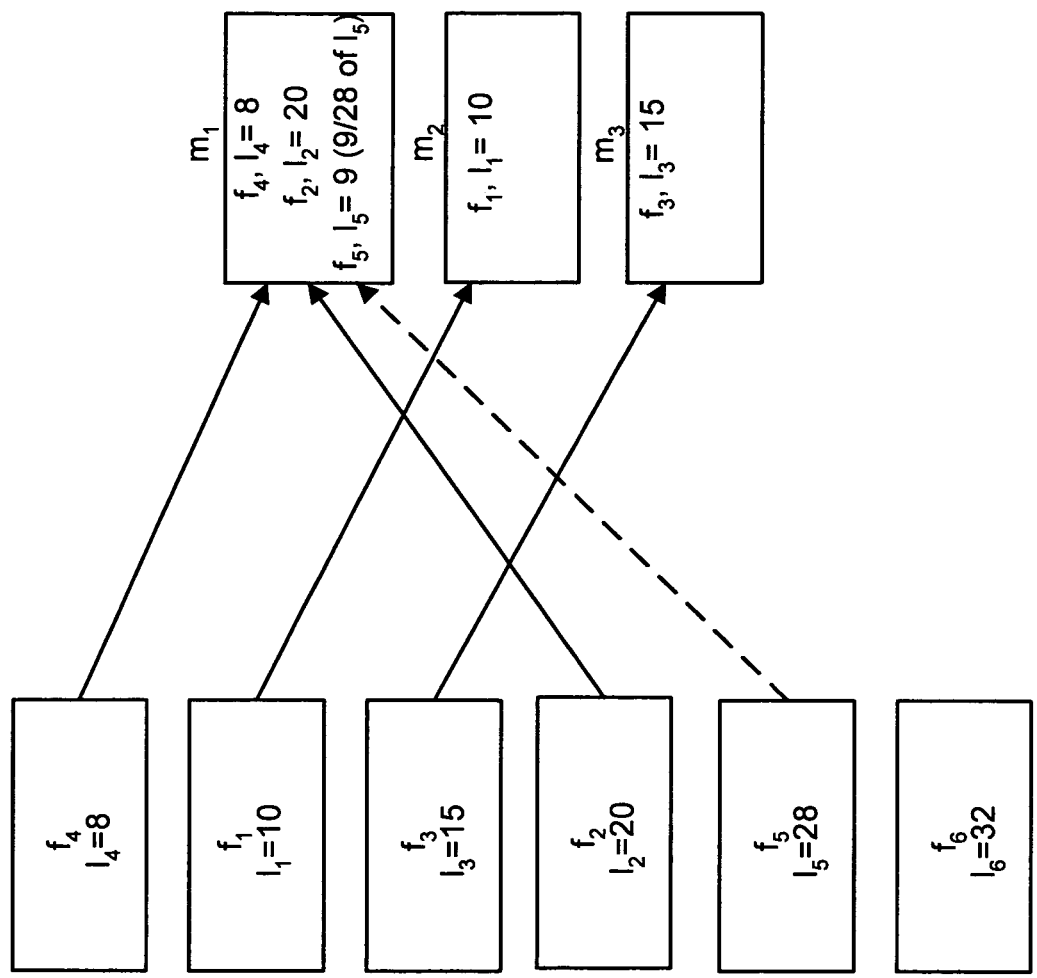

Continuing with the example shown in FIG. 7A, FIG. 7B is a diagram illustrating assigning files $f_1$ to $f_6$ to three machines, labeled $m_1$ to $m_3$, as performed in act 602. In this example, Average is equal to 37

$$\left(\frac{8+10+15+20+28+30}{3}\right).$$

The file $f_4$ may first be assigned to $m_1$, followed by $f_1$ being assigned to $m_2$, followed by $f_3$ being assigned to $m_3$, followed by $f_2$ being assigned to $m_1$. The load corresponding to file $f_5$ (28) would next be scheduled to be assigned to $m_2$. The potential combined load at this machine, however, is greater than A (10+28 is greater than 37). Accordingly, file $f_5$ is not assigned to $m_2$ and processing proceeds to act 603.

A "current machine" may be selected as an available machine with a maximum number of assigned files (act 603). In the example of FIGS. 7A and 7B, machine $m_1$ is assigned more files than machines $m_2$ or $m_3$. Accordingly, machine $m_1$ is selected as the current machine. The next unassigned file in sorted order (e.g., file $f_5$) is set as the "current file" (act 604). The current file may then be assigned to the current machine and as much of the load of the current file until the current machine reaches load Average or all of the load of the current file is assigned to the current machine (act 605). In the example of FIG. 7, current file $f_5$ is assigned to current machine $m_1$ along with 9/28 of the load of $f_5$. Machine $m_1$ is now filled and is unavailable. The load of $f_5$, however, has not been fully assigned.

Load balancer 420 may determine whether the whole load of the current file has been assigned (act 606). If so, the next unassigned file is set as the current file (act 604). Otherwise, load balancer 420 determines whether the remaining load of the current file fills an available machine with a maximum number of assigned files (act 607). If yes, this available machine is set as the current machine, (act 608), and the process returns to act 605. If no, the current machine is set as an available machine with a minimum number of assigned files, (act 609), and the process returns to act 605.

Figure 7C:
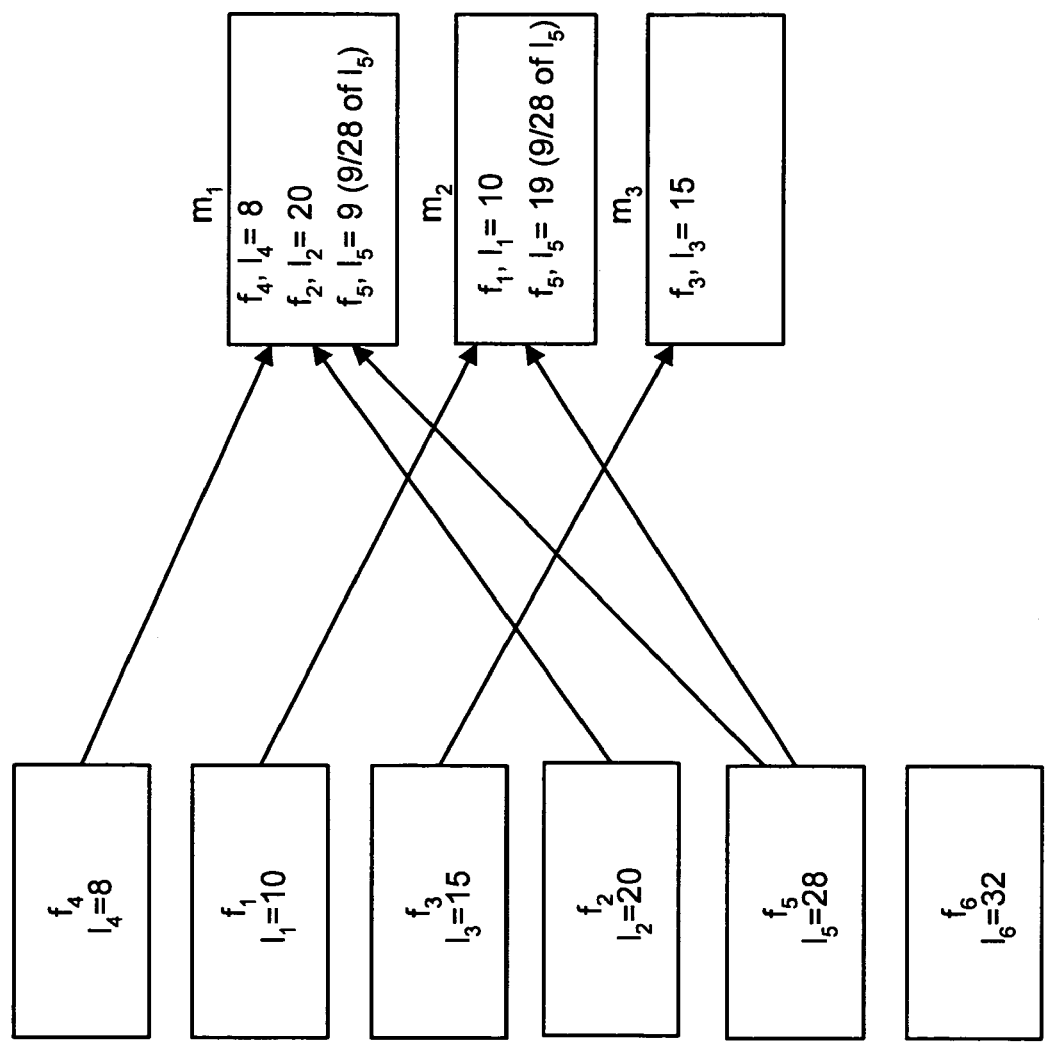
Figure 7D:
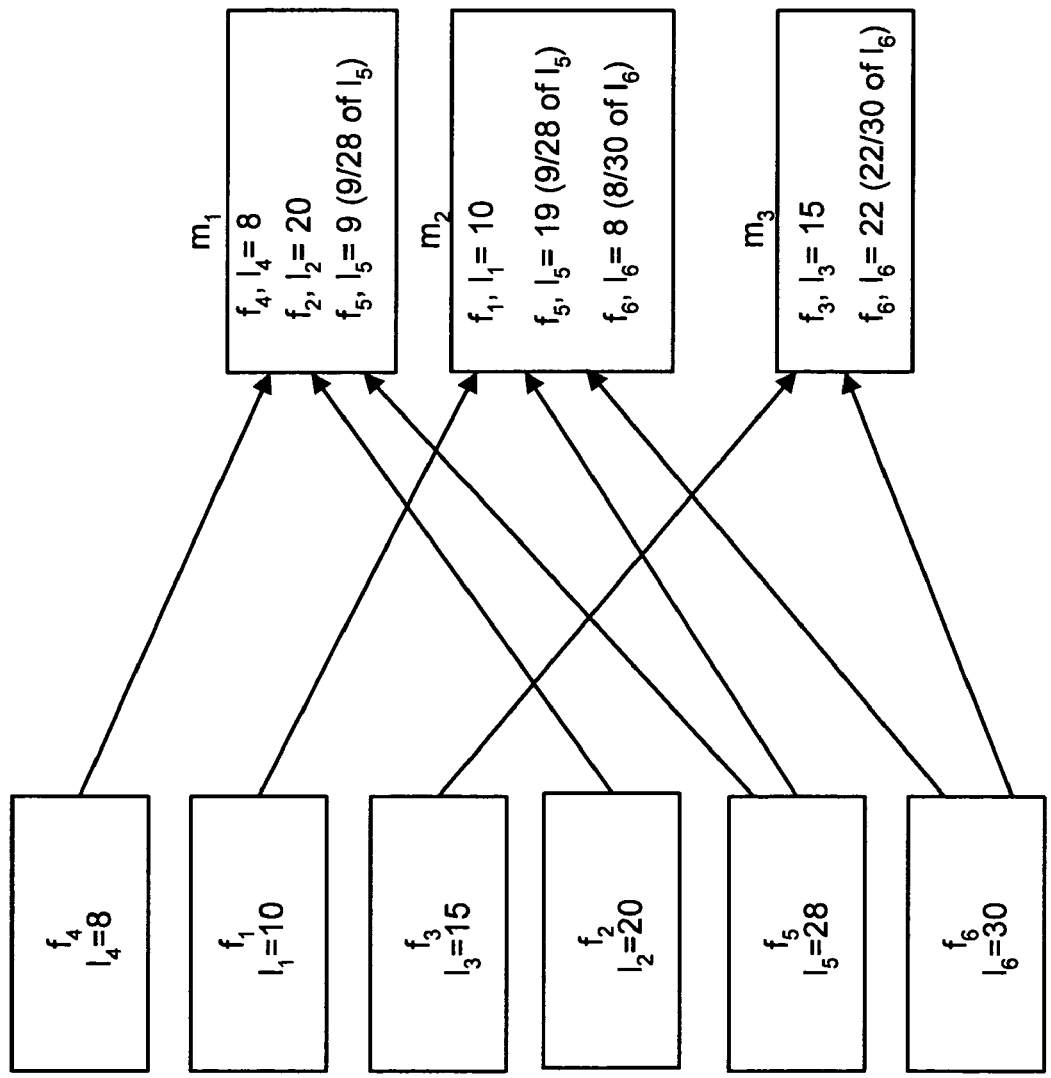

Returning to the example of FIG. 7B, the whole load of $f_5$ will be determined to have not been assigned in act 606. The remaining load of $f_5$, (19/28) of $l_5$, does not fill either machine $m_2$ or $m_3$, and accordingly, the current machine is set as either machine $m_2$ or machine $m_3$ (acts 607 and 609). Assume $m_2$ is set as the current machine. The remainder of $I_5$ is then assigned to machine $m_2$ (act 605). At this point, the assigned state of the files is shown in FIG. 7C. The next unassigned file, $f_6$, may next be set as the current file (acts 606, 604). The load of $f_6$ will then be divided between machines $m_2$ and $m_3$. The final assigned state of the files and loads is shown in FIG. 7D. As shown, machines, $m_1$, $m_2$, and $m_3$ are assigned equal total load values. Additionally, the number of files assigned to each machine is within one file of all the other machines. In the example of FIG. 7D, for instance, each machine is assigned two or three files.

The processes and systems described above operate to balance loads over multiple computing devices. In addition to balancing loads, the number of files assigned to each machine will generally be equal (plus or minus at most one file). In one implementation, the loads may be processing loads associated with files that collectively define a larger data structure, such as an index of a large corpus of documents.

The processes and systems described above work particularly well with "greedy" assignment algorithms. In a greedy assignment algorithm, requests for processing resources, such as requests to access a file stored at a machine, are always sent to the machine with the least total request load of all the machines that are assigned the file applicable to the request.

Exemplary Implementation

Figure 8:
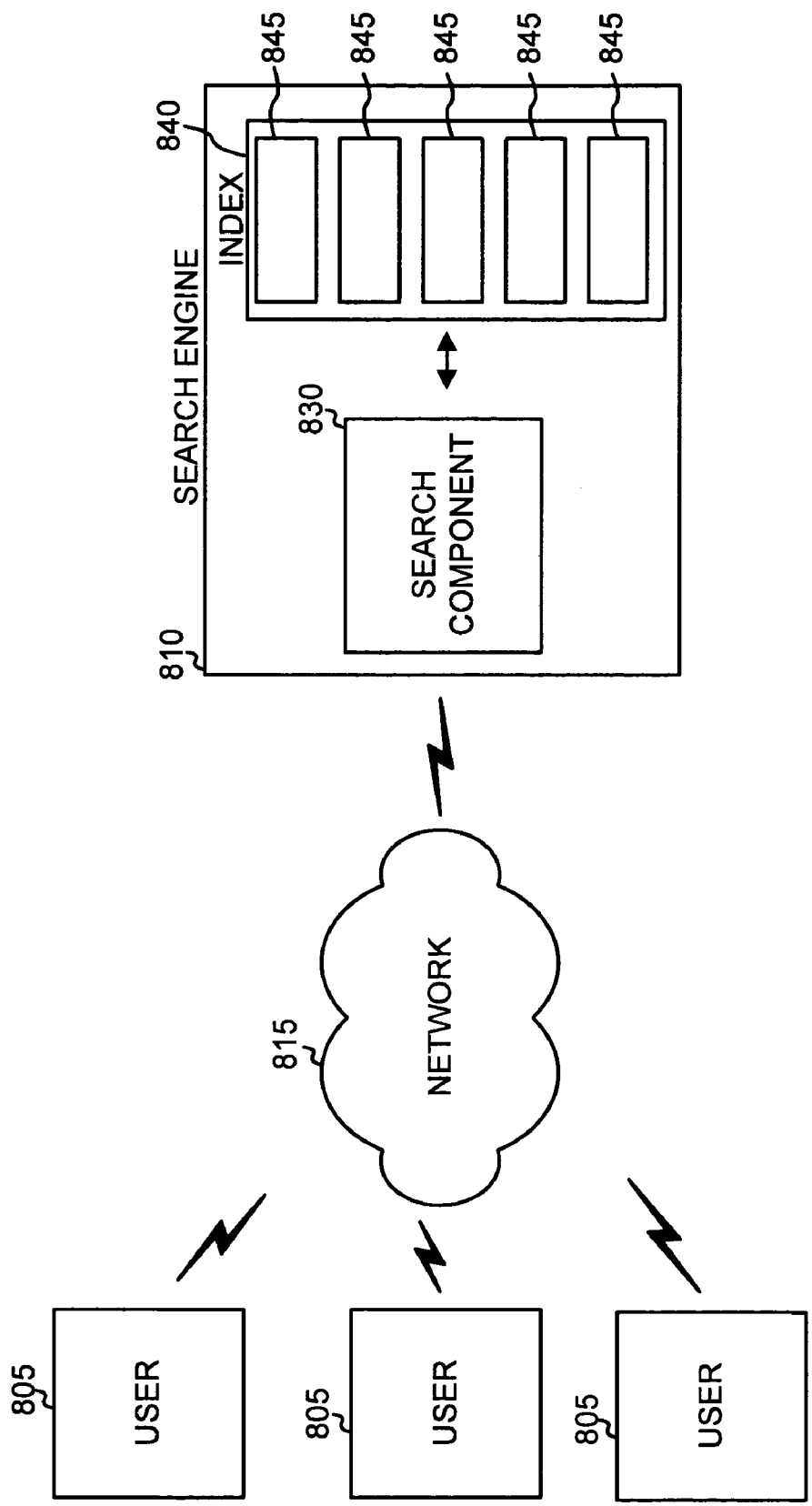
FIG. 8 is a diagram illustrating an exemplary implementation of the load balancer shown in FIG. 4 implemented in the context of an Internet search engine.

FIG. 8 is a diagram illustrating an exemplary implementation of load balancer 420 implemented in the context of an Internet search engine. A number of users 805 may connect to a search engine 810 over a network 815, such as the Internet. Search engine 810 may be a traditional search engine that returns a ranked set of documents related to a user query. Search engine 810 may be a general search engine, such as one based on all documents from a large collection, such as documents on the web, or a more specialized search engine, such as a news search engine. In other implementations, search engine 810 may be implemented over a specialized corpus of documents, such as a corporate document database made available over a corporate network 815.

In operation, search engine 810 may receive a user query and submit the search query to search component 830. Search component may compare terms in the search query to document index 840. Document index 840 may be distributed as a number of files, associated with processing loads, stored on multiple computing devices 845. Computing devices 845 may simultaneously process the request from search component 830. The files and loads may have been previously assigned by load balancer 420 such that the loads are approximately evenly distributed over computing devices 845. Search component 830 may return the results of the search query to the requesting user 805.

CONCLUSION

Techniques for evenly distributing loads to multiple computing devices were described.

It will be apparent to one of ordinary skill in the art that aspects of the invention, as described above, may be implemented in many different forms of software, firmware, and hardware in the implementations illustrated in the figures.

The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders.

No element, act, or instruction used in the present application should be construed as critical or essential to the invention unless explicitly described as such. Also, as used herein, the article "a" is intended to potentially allow for one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   dividing, using one or more processors associated with one or more server devices, a data structure into a plurality of files;
   determining, using one or more processors associated with the one or more server devices, loads for the plurality of files, where the load of a file comprises a measure of processing resources required for processing the file;
   distributing, using one or more processors associated with the one or more server devices, the loads to a plurality of computing devices such that each of the plurality of computing devices is assigned a same predetermined number of files, plus or minus one file, and such that a maximum total load distributed to a computing device is equal to or less than an average load distributed to the plurality of computing devices,
   where the predetermined number is based on a ratio of a number of the plurality of files to a number of the plurality of computing devices, and
   where distributing the loads to a plurality of computing devices further includes:
      sorting the files by increasing load; and
      assigning the files in a sequence based on increasing load to the plurality of computing devices as long as the load of a file does not increase the load of a computing device to equal to or greater than the average load distributed to the plurality of computing devices, and
      storing the plurality of files in the plurality of computing devices based on the distributing.

2. The method of claim 1, where the files are assigned in a round-robin sequence.

3. The method of claim 1, further comprising:
   assign a partial one of the loads associated with a particular one of the plurality of files to a particular one of the plurality of computing devices to reach the average load.

4. The method of claim 3, further comprising:
   selecting another one of the plurality of computing devices as one of the computing devices with a maximum number of assigned files when a remaining load of the particular file fills the another one of the plurality of computing devices.

5. The method of claim 3, further comprising:
   selecting another one of the plurality of computing devices as one of the computing devices with a minimum number of assigned files when a remaining load of the particular file does not fill an available one of the plurality of computing devices with a maximum number of assigned files.

6. The method of claim 1, where determining the loads for the plurality of files includes:
   determining the loads based on a historical analysis of processing resources required for processing the files.

7. The method of claim 1, where the data structure is a document index.

8. The method of claim 1, where the maximum total load assigned to each of the plurality of computing devices is exactly equal to the average load of the computing devices.

9. A method of assigning a plurality of files to a plurality of computing devices comprising:
   sorting, using one or more processors associated with one or more server devices, the plurality of files by increasing load, based on load values estimated for each of the plurality of files, where the load values are based on a historical analysis of processing resources required for processing the plurality of files;
   assigning, one or more processors associated with the one or more server devices, the plurality of files to the plurality of computing devices such that a maximum load value distributed to any one of the plurality of computing devices is equal to or less than an average load distributed to the plurality of computing devices, and each of the plurality of computing devices being assigned a predetermined number of files, plus or minus one file, where the predetermined number of files is based on a ratio of a number of the plurality of files to a number of the plurality of computing devices; and
   storing the files in the plurality of computing devices based on the assigning.

10. The method of claim 9, where each of the plurality of computing devices is assigned no more than a predetermined maximum number of files.

11. The method of claim 9, where sorting the plurality of files comprises:
   sorting the load values estimated for each of the plurality of files in ascending order; and
   ordering each of the plurality of files in the ascending order based on their respective load values.

12. The method of claim 9, where assigning the plurality of files to the plurality of computing devices further includes:
   assigning the plurality of files in a sequence based on the load values to the plurality of computing devices as long as the load value of a file does not increase the load value of one of the plurality of computing devices to or greater than the average load value distributed to the plurality of computing devices.

13. The method of claim 12, where the plurality of files are assigned in a round-robin sequence.

14. The method of claim 12, further comprising:
   distributing a partial one of the load values associated with a particular one of the plurality of files to a particular one of the plurality of computing devices.

15. The method of claim 14, further comprising:
   selecting another one of the plurality of computing devices as one of the computing devices with a maximum number of assigned files when a remaining load value of the particular one of the plurality of files fills the another one of the plurality of computing devices.

16. The method of claim 14, further comprising:
selecting another one of the plurality of computing devices as one of the computing devices with a minimum number of assigned files when a remaining load value of the particular one of the plurality of files does not fill an available one of the plurality of computing devices with a maximum number of assigned files.

17. The method of claim 9, where a total of the load values assigned to each of the plurality of computing devices is exactly equal to the average load assigned to the computing devices.

18. A device comprising:
means for dividing a data structure into a plurality of files;
means for determining loads for the plurality of files, where the load of a file is based on processing resources required to process the file;
means for distributing the loads to a plurality of computing devices, each of the plurality of computing devices being assigned a same predetermined number of files, plus or minus one file, and a maximum load distributed to a computing device being equal to or less than an average load distributed to the plurality of computing devices, where the predetermined number is based on a ratio of a number of the plurality of files to a number of the plurality of computing devices, where the means for distributing the loads to a plurality of computing devices further includes:
sorting the files by increasing load; and
assigning the files in a sequence based on increasing load to the plurality of computing devices as long as the load of a file does not increase the load of a computing device to equal to or greater than the average load distributed to the plurality of computing devices, and
means for distributing a partial one of the loads associated with a particular one of the plurality of files to a particular one of the plurality of computing devices to reach the average load; and
a memory to store the plurality of files in the plurality of computing devices based on the distributing.

19. The device of claim 18, where the plurality of files are assigned in a round-robin sequence.

20. One or more memory devices containing processing instructions, that when executed by processing logic, cause the processing logic to:
compute load values for a plurality of files based on historical analysis of processing resources required to process the files;
sort the plurality of files by increasing load, based on the load values determined for each of the plurality of files; and
assign the plurality of files to a plurality of computing devices, a maximum load value assigned to a computing device being equal to or less than an average load value assigned to the plurality of computing devices, and each of the plurality of computing devices being assigned a predetermined number of files, plus or minus one file, where the predetermined number of files is based on a ratio of a number of the plurality of files to a number of the plurality of computing devices.

21. A method comprising:
dividing, using one or more processors associated with one or more server devices, a data structure into a plurality of files;
determining, using one or more processors associated with the one or more server devices, loads for the plurality of files, where the loads comprise a measure of processing resources required for processing the plurality of files;
sorting, using one or more processors associated with the one or more server devices, the plurality of files by increasing load;
assigning, using one or more processors associated with the one or more server devices, the files in a round-robin sequence to a plurality of computing devices as long as the load of a file does not increase the load of a computing device to or greater than the average load distributed to the plurality of computing devices, the plurality of files being assigned such that each of the plurality of computing devices is assigned a predetermined number of files, plus or minus one file, and such that a maximum total load distributed to each of the plurality of computing devices is equal to or less than an average load taken over all of the plurality of computing devices, where the predetermined number is based on a ratio of a number of the plurality of files to a number of the plurality of computing devices; and
storing the plurality of files in the plurality of computing devices based on the assigning.

22. The one or more memory devices of claim 20, further comprising instructions to:
assign a partial one of the load values associated with a particular one of the plurality of files to a particular one of the computing devices to reach the average load.

23. The one or more memory devices of claim 20, where each of the plurality of computing devices is assigned no more than a predetermined maximum number of files.

24. The method of claim 21, further comprising:
determining the loads based on a historical analysis of processing resources required for processing the files.

25. The method of claim 21, where the predetermined number of files is based on a number of the plurality of computing devices and a number of the plurality of files.

26. A method performed by one or more server devices the method comprising:
determining, using one or more processors associated with one or more server devices, loads for a plurality of files, where a load of a file is based on a historical analysis of processing resources required for processing the file;
sorting, using one or more processors associated with the one or more server devices, the plurality of files by increasing load;
calculating, using one or more processors associated with the one or more server devices, an average load based on the determined loads and based on a number of files in the plurality of files;
selecting, using one or more processors associated with the one or more server devices, a plurality of available computing devices;
assigning, using one or more processors associated with the one or more server devices, files of the plurality of files to computing devices of the plurality of computing devices in a round-robin sequence, as long as assigning a particular file to a particular computing device would not increase a load distributed to the particular computing device above the average load; wherein each of the plurality of computing devices is assigned a same predetermined number of files, plus or minus one file, and such that a maximum total load distributed to a computing device is equal to or less than an average load distributed to the plurality of computing devices, where the predetermined number is based on a ratio of a number of the plurality of files to a number of the plurality of computing devices, and when assigning the particular file to the particular computing device would increase the load distributed to the particular computing device above the average load, distributing, using one or more processors associated with the one or more server devices, a portion of the load of the particular file to a first computing machine with a largest number of assigned files, where the portion of the load increases a total load distributed to the first computing machine to the average load, and distributing, using one or more processor associated with the one or more server devices, a remaining portion of the load of the particular file to a second computing device.

27. The method of claim 26, where the plurality of files comprises a document index.

* * * * *

UNITED STATES PATENT AND TRADEMARK OFFICE
CERTIFICATE OF CORRECTION

| | |
|---|---|
| PATENT NO. | : 7,631,310 B1 |
| APPLICATION NO. | : 10/930848 |
| DATED | : December 8, 2009 |
| INVENTOR(S) | : Monika H. Henzinger |

Page 1 of 1

It is certified that error appears in the above-identified patent and that said Letters Patent is hereby corrected as shown below:

Column 10, line 37, after "devices" insert -- , --.

Column 12, line 1, delete "processor" and insert -- processors --.

Signed and Sealed this

Second Day of February, 2010

David J. Kappos
*Director of the United States Patent and Trademark Office*